(12) United States Patent
Olaru

(10) Patent No.: US 7,115,226 B2
(45) Date of Patent: Oct. 3, 2006

(54) STACK MOLD HAVING A MELT HOMOGENIZING ELEMENT

(75) Inventor: George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 371 days.

(21) Appl. No.: 10/465,861

(22) Filed: Jun. 20, 2003

(65) Prior Publication Data

US 2004/0256768 A1 Dec. 23, 2004

(51) Int. Cl.
*B29C 45/22* (2006.01)

(52) U.S. Cl. ............... 264/328.6; 264/328.8; 425/564; 425/572

(58) Field of Classification Search .......... 425/549, 425/572, 564; 264/328.6, 328.8
See application file for complete search history.

(56) References Cited

U.S. PATENT DOCUMENTS

| | | |
|---|---|---|
| 4,891,001 A | 1/1990 | Gellert |
| 4,965,028 A | 10/1990 | Maus et al. |
| 5,011,646 A | 4/1991 | Bertschi |
| 5,229,145 A | 7/1993 | Brown et al. |
| 5,262,119 A | 11/1993 | Smith |
| 5,458,843 A | 10/1995 | Brown et al. |
| 5,460,510 A | 10/1995 | Gellert |
| 5,513,976 A | 5/1996 | McGrevy |
| 5,683,731 A | 11/1997 | Deardurff et al. |
| 5,846,472 A | 12/1998 | Rozema et al. |
| 5,941,637 A | 8/1999 | Maurer |
| 5,968,562 A | 10/1999 | Schad et al. |
| 6,089,468 A | 7/2000 | Bouti |
| 6,305,923 B1 | 10/2001 | Godwin et al. |
| 6,382,528 B1* | 5/2002 | Bouti .................. 425/567 |
| 6,575,731 B1 | 6/2003 | Babin et al. |
| 2002/0070288 A1* | 6/2002 | Bouti .................. 239/135 |
| 2002/0167103 A1 | 11/2002 | Ickinger |
| 2004/0071818 A1 | 4/2004 | Dewar |

FOREIGN PATENT DOCUMENTS

| | | |
|---|---|---|
| EP | 0 293 756 A2 | 7/1988 |
| JP | 58-051125 A | 3/1983 |
| JP | 60-240425 | 11/1985 |
| JP | 6-848 A | 1/1994 |
| JP | 6-23806 A | 2/1994 |
| JP | 10-24453 A | 1/1998 |
| JP | 10006363 | 1/1998 |
| JP | 2000-71288 A | 3/2000 |
| WO | WO 00/67985 A1 | 11/2000 |
| WO | WO 02/074516 | 9/2002 |
| WO | WO 02/087846 A2 | 11/2002 |
| WO | WO 03/035358 | 5/2003 |

OTHER PUBLICATIONS

"Heiβkanalsysteme für Etagenformen zum Spritzen von Verpackungsartikeln" English translation included: "Hot-channel systems for multi-stage moulds for the injection moulding of packaging articles," R. Friedrich, Apr. 28-29, 1988 (seminar)
Patent Abstracts of Japan, vol. 1998, No. 5, Apr. 30, 1998.

* cited by examiner

*Primary Examiner*—Tim Heitbrink
(74) *Attorney, Agent, or Firm*—Medler Ferro PLLC

(57) ABSTRACT

A stack injection molding apparatus includes a melt homogenizing element provided between a first transfer nozzle, which is coupled to a melt source, and a second transfer nozzle, which is coupled to a manifold. The melt homogenizing element is used for redistributing a melt stream in order to provide a homogenized melt stream having a generally uniform temperature and viscosity profile or sectional distribution.

20 Claims, 12 Drawing Sheets

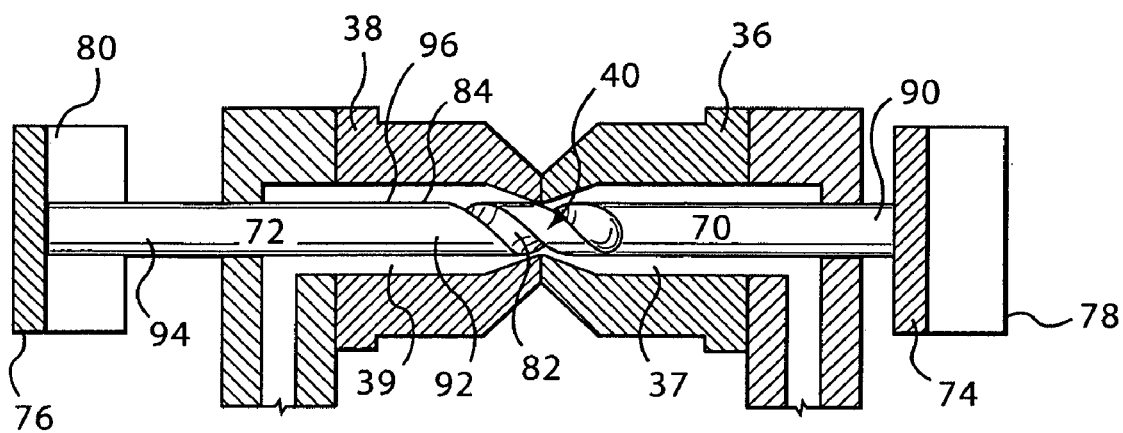
FIG. 3
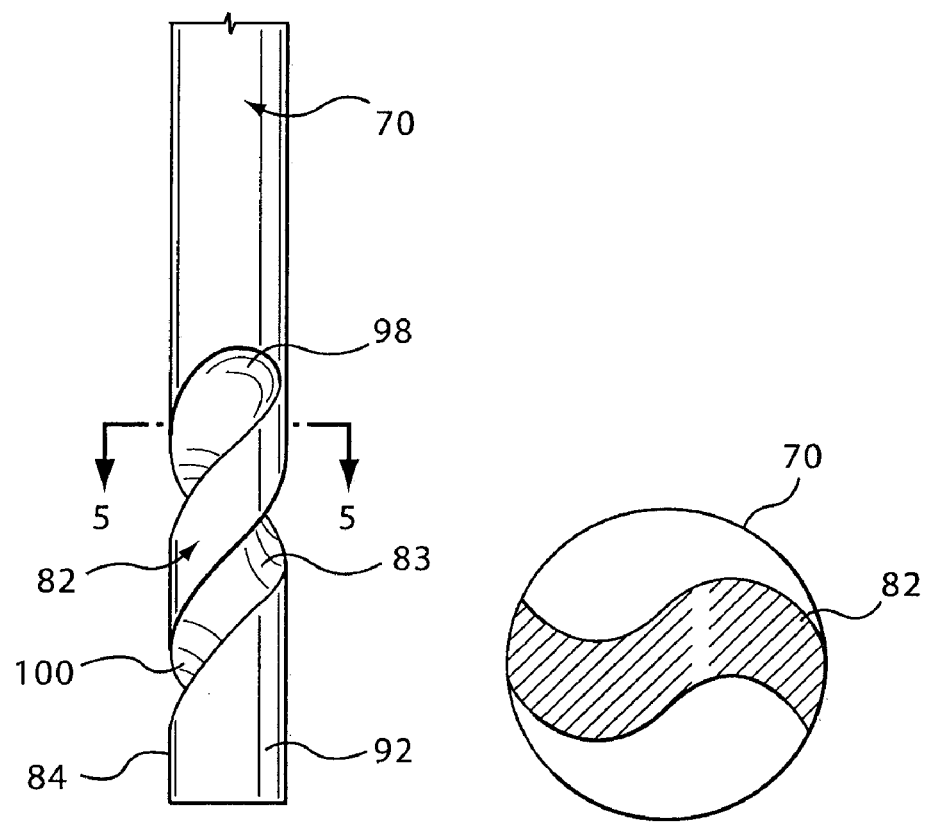
FIG. 4
FIG. 5

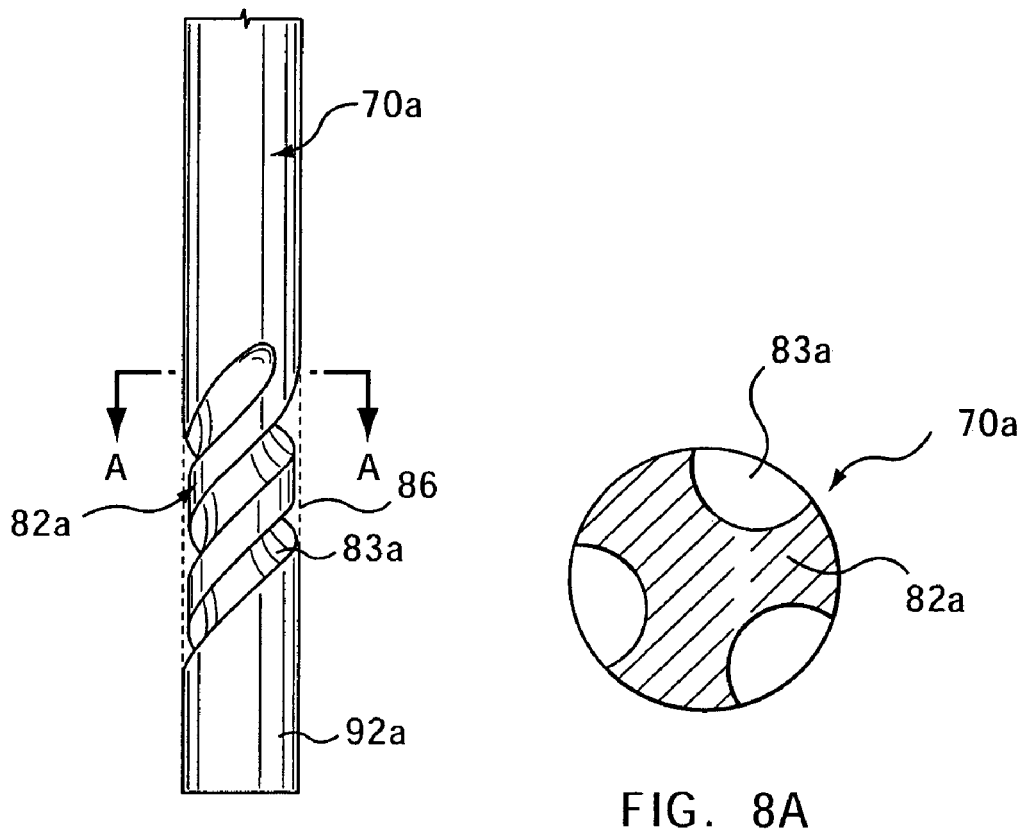
FIG. 8
FIG. 8A
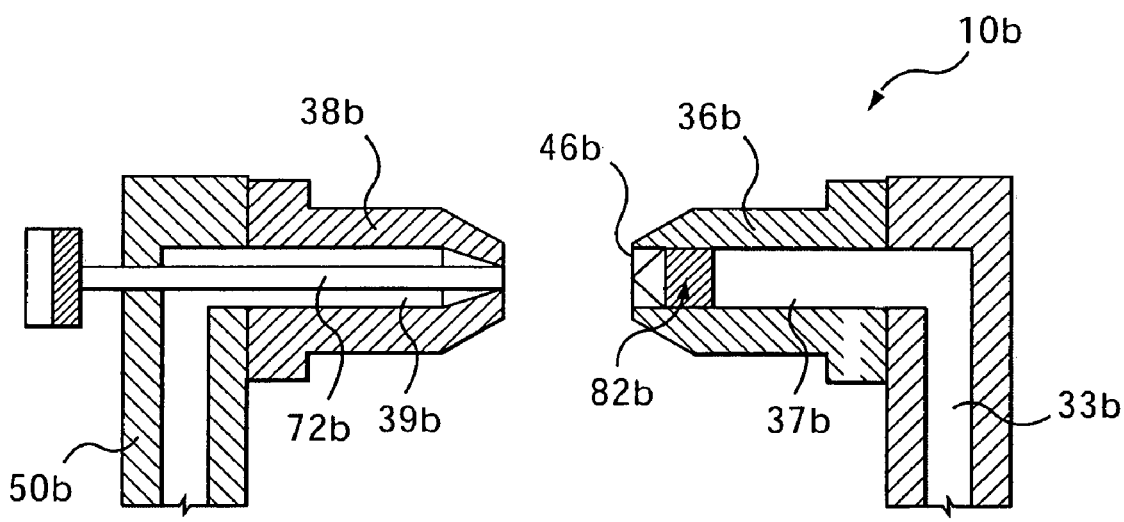
FIG. 9

STACK MOLD HAVING A MELT HOMOGENIZING ELEMENT

FIELD OF THE INVENTION

The present invention relates generally to a stack injection molding apparatus and, in particular, to a melt homogenizing element for use in a stack injection molding apparatus.

BACKGROUND OF THE INVENTION

Stack molding provides an advantage over single molding in that it enables the output of an injection molding machine to be at least doubled without significantly increasing its size. Stack mold configurations such as shown in U.S. Pat. No. 5,846,472 to Rozema, and U.S. Pat. No. 5,229,145 to Brown generally employ a stationary first platen, a movable center platen and a movable second platen. The mold cavities are conventionally located on opposing faces of the movable center platen. The movable center platen and the second movable platen reciprocate to open and close the mold cavities during a production cycle. In a stack molding apparatus, the manifold system extends through the center platen in order to reach the mold cavities located on each side of the center platen via an equal path length.

Typically, multi-cavity stack molds use a valve gated melt transfer nozzle, which is coupled to the movable platen, for delivering melt from the extruder nozzle of the injection molding machine to the manifold. The melt transfer nozzle moves into and out of engagement with a second valve gated melt transfer nozzle that is linked to the extruder. The manifold delivers melt from the melt transfer nozzle into injection nozzles that are associated with each individual mold cavity.

As a result of the reciprocating action of the movable platens, the melt transfer nozzles are continuously coupled to and decoupled from one another. In prior art valve gated melt transfer nozzles, this results in drooling and stringing between the nozzles, which is undesirable.

There are a large number of variables in a multi-cavity injection molding process that affect the quality of the molded parts produced. One such variable is shear induced flow imbalance. As the melt flows through the manifold, the melt near the perimeter of the melt channel experiences high shear conditions due to the relative velocity of the melt flow with respect to the stationary boundary of the melt channel, whereas the melt near the center of the melt channel experiences low shear conditions. As such, the shear rate and temperature, and therefore the viscosity vary both along and across the melt channel. When the melt channel splits into two branches, the center to perimeter variation becomes a side-to-side variation after the split. This side-to-side variation typically results in a variation in melt conditions from one side to the other of the parts molded from each of the runner branches. If the melt channel branches out to deliver melt to four or more mold cavities, the melt in each of the branches will be different, which will result in variations in the product created in each of the mold cavities.

The melt that is delivered from the extruder is often not evenly balanced. Further, when valve gated melt transfer nozzles are used to transfer melt from the extruder to the manifold, the melt flow imbalance is worsened due to the effect of the valve pins partially obstructing the melt flow. Therefore, in order to reduce the magnitude of the melt flow imbalance effect at the mold cavities, it is necessary to ensure that the melt entering the manifold is evenly distributed across the melt channel cross-section.

It is therefore an object of the present invention to obviate or mitigate at least one of the above disadvantages.

SUMMARY OF THE INVENTION

According to an embodiment of the present invention there is provided an injection molding apparatus including:

a first melt transfer nozzle having a first melt transfer channel for receiving a melt stream of moldable material under pressure;

a second melt transfer nozzle having a second melt transfer channel for selectively receiving the melt stream from the first melt transfer channel;

a manifold having a manifold channel for receiving the melt stream from the second melt transfer channel and delivering the melt stream to a nozzle channel of a nozzle;

a mold cavity receiving the melt stream from the nozzle, the nozzle channel communicating with the mold cavity through a mold gate;

a valve pin extending through the first melt transfer channel, the valve pin having a diameter sized to restrict melt flow between the first melt transfer channel and the second melt transfer channel;

a melt homogenizing element provided in the valve pin, the melt homogenizing element having a melt channel for receiving the melt stream; and wherein the valve pin is movable to selectively locate the melt homogenizing element across a portion of the first melt transfer channel and a portion of the second melt transfer channel simultaneously to allow melt to flow between the first melt transfer channel and the second melt transfer channel.

According to another embodiment of the present invention there is provided an injection molding apparatus including:

a first melt transfer nozzle having a first melt transfer channel for receiving a melt stream of moldable material under pressure;

a second melt transfer nozzle having a second melt transfer channel for selectively receiving the melt stream from the first melt transfer channel;

a manifold having a manifold channel for receiving the melt stream from the second melt transfer channel and delivering the melt stream to a nozzle channel of a nozzle;

a mold cavity receiving the melt stream from the nozzle, the nozzle channel communicating with the mold cavity through a mold gate;

a melt homogenizing element associated with one of the first melt transfer channel and the second melt transfer channel, the melt homogenizing element for redistributing melt in the melt stream so that the melt stream exiting the melt homogenizing element has a more uniform temperature and viscosity profile than the melt stream entering the melt homogenizing element.

According to another embodiment of the present invention there is provided a method of improving melt flow in a stack injection molding apparatus comprising:

providing a first transfer nozzle having a first melt channel for receiving a melt stream from a melt source, the melt stream having a first temperature and viscosity distribution;

providing a second transfer nozzle having a second melt channel for receiving the melt stream from the first melt channel;

providing a melt homogenizing element in at least one of the first transfer nozzle and the second transfer nozzle for changing the melt stream from the first temperature and viscosity distribution to a second temperature and viscosity distribution;

wherein the second temperature and viscosity distribution is more uniform than the first melt flow distribution.

According to another embodiment of the present invention there is provided an injection molding apparatus including:

a first melt transfer nozzle having a first melt transfer channel for receiving a melt stream of moldable material under pressure;

a second melt transfer nozzle having a second melt transfer channel for selectively receiving the melt stream from the first melt transfer channel;

a manifold having a manifold channel for receiving the melt stream from the second melt transfer channel and delivering the melt stream to a nozzle channel of a nozzle;

a mold cavity receiving the melt stream from the nozzle, the nozzle channel communicating with the mold cavity through a mold gate;

a melt homogenizing element provided in one of the first melt transfer channel and the second melt transfer channel, the melt homogenizing element having a melt channel for receiving the melt stream; and wherein the melt homogenizing element resets a shear history of the melt stream to deliver a generally homogenized melt stream to the manifold.

The present invention provides an advantage in that the melt is homogenized between the first melt transfer nozzle and the second melt transfer nozzle of the stack injection molding apparatus so that the melt entering the manifold is generally uniform in temperature and viscosity, thus shear induced flow imbalance in the injection molding apparatus may be reduced.

BRIEF DESCRIPTION OF THE FIGURES

Embodiments of the present invention will now be described more fully with reference to the accompanying drawings in which like reference numerals indicate similar structure.

FIG. 3 shows an enlarged portion of the injection molding apparatus of FIG. 1;

FIG. 4 is an isometric view of a valve pin of the injection molding apparatus of FIG. 1;

FIG. 5 is a view on 5—5 of FIG. 4;

FIG. 8 is an isometric view of a valve pin according to another embodiment of the present invention;

FIG. 9 is a schematic side sectional view of portions of an injection molding apparatus according to another embodiment of the present invention;

DETAILED DESCRIPTION OF THE INVENTION

Figure 1:
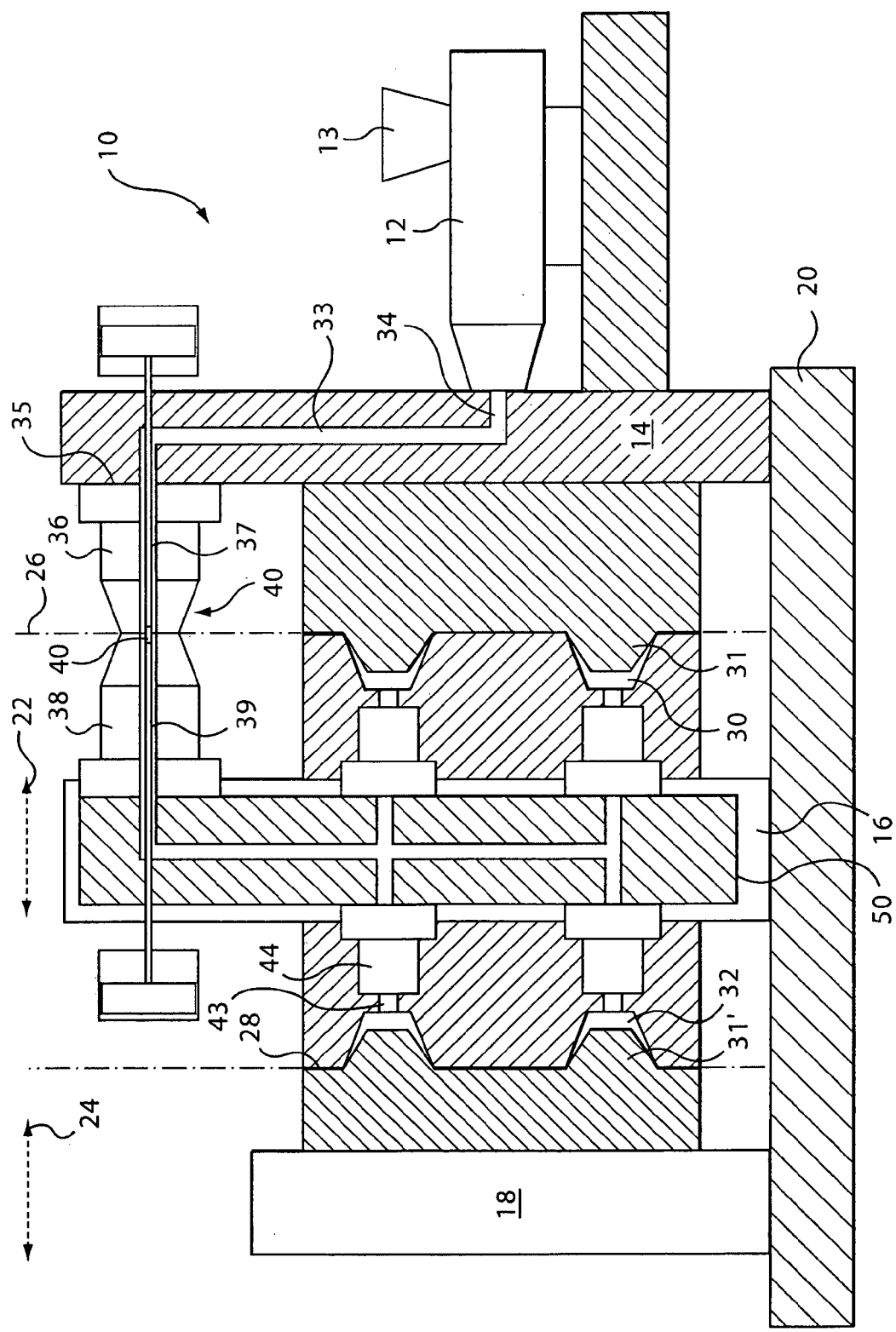
FIG. 1 is a schematic side view partly in section of an injection molding apparatus according to an embodiment of the present invention.

Referring now to FIG. 1, a stack injection molding apparatus is generally indicated by reference numeral 10. As shown, a base 20 supports a stationary first platen 14, a movable center platen 16 and a movable second platen 18. The movable center platen 16 and movable second platen 18 are coupled to the stationary first platen 14 and are movable relative thereto, as indicated by arrows 22 and 24, by a positioning mechanism (not shown). The movable center platen 16 and the movable second platen 18 split the stack injection molding apparatus 10 at parting lines 26 and 28, respectively.

A manifold 50 is located in the movable center platen 16 to deliver melt to a series of nozzles 44. Heaters (not shown) are provided in the stationary first platen 14 and the movable center platen 16 to maintain the melt stream at a desired temperature as it travels through the injection molding apparatus 10. Each nozzle 44 includes a nozzle heater (not shown) that is embedded therein or coupled thereto in any manner known in the art.

Figure 2:
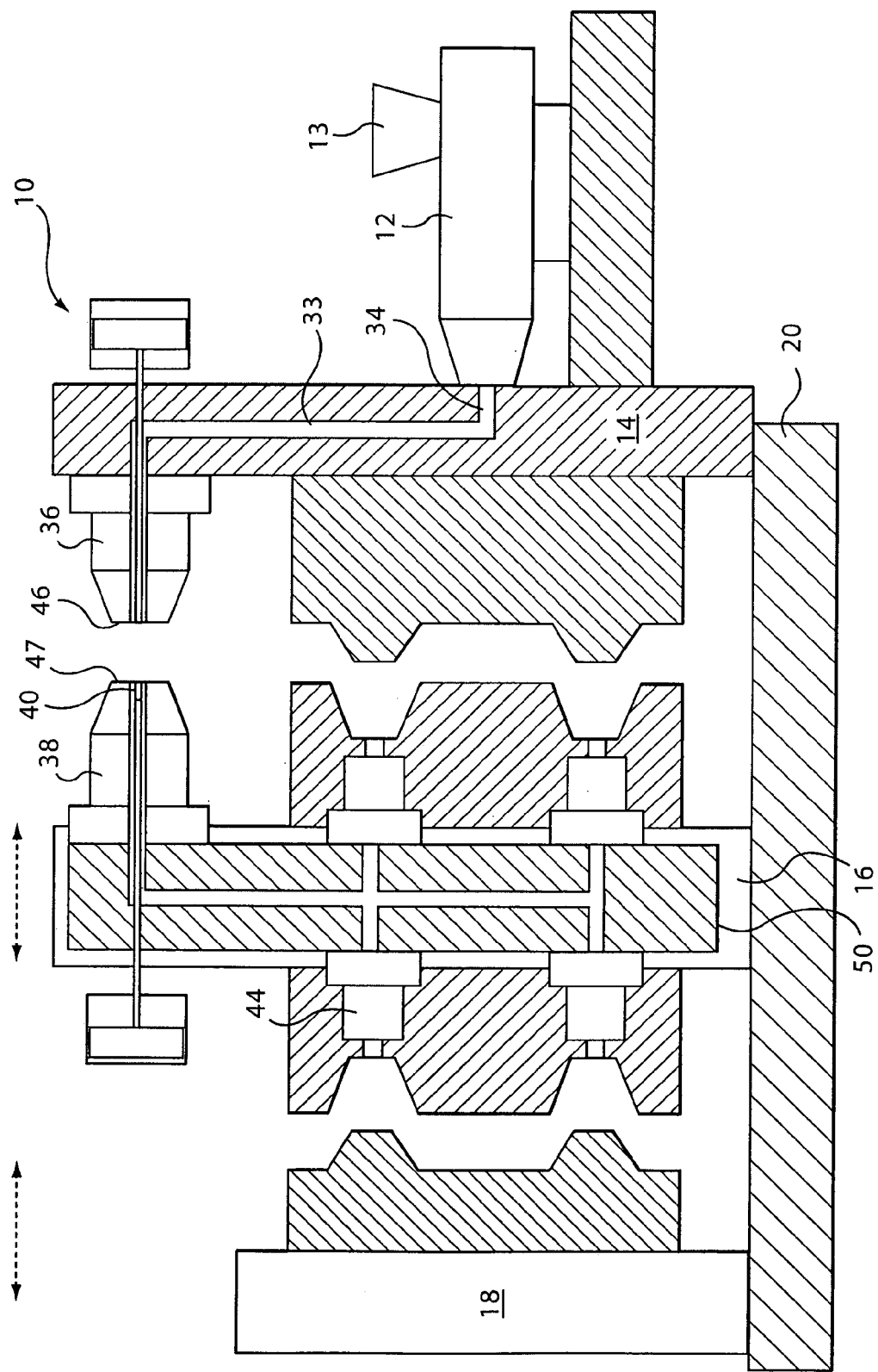
FIG. 2 shows the injection molding apparatus of FIG. 1 in a molded part ejection position.

A first series of maid cavities 30 is located between the movable center platen 16 and a first series of mold cores 31, which project from the stationary first platen 14. Similarly, a second series of mold cavities 32 is located between the movable center platen 16 and a second series of mold cores 31', which project from the movable second platen 18. The nozzles 44 deliver melt to the mold cavities 30 and 32 through mold gates 43. The mold cavities 30, 32 are cooled by cooling channels (not shown). When properly cooled, the stack injection molding apparatus 10 is moved to an ejection position, as shown in FIG. 2, and the molded parts are air ejected from the mold cavities 30, 32.

A sprue bushing 34 extends between a machine nozzle 12 and a melt channel 33. A first melt transfer nozzle 36, having a first melt transfer channel 37, is coupled to an outlet 35 of the melt channel 33. A second melt transfer nozzle 38, having a second melt transfer channel 39, is coupled to the first melt transfer nozzle 36 to receive melt therefrom and deliver the melt to manifold 50. The first and second melt transfer nozzles 36,38 are provided with heaters (not shown). The heaters may be of any type suitable for providing heat to melt flowing through the nozzles 36, 38.

A melt transfer device 40 is provided between the first melt transfer nozzle 36 and the second melt transfer nozzle 38 to control the flow of melt therebetween. Referring to FIG. 3, the melt transfer device 40 comprises a first valve pin 70 that extends through the first melt transfer channel 37 of the first melt transfer nozzle 36 and a second valve pin 72 that extends through the second melt transfer channel 39 of the second melt transfer nozzle 38. The first valve pin 70 includes a first end 90 and a second end 92. The first end 90 of the first valve pin 70 is coupled to a piston 74 that is movable within a cylinder 78. The piston 74 is air driven. Passages (not shown) are provided on either side of the piston 74 to allow air to enter and leave the cylinder 78.

The second valve pin 72 includes a first end 94 and a second end 96. The second end 96 of the second valve pin 72 abuts the second end 92 of the first valve pin 70. Similar to the first valve pin 70, the first end 94 of the second valve pin 72 is coupled to a piston 76 that is movable within a cylinder 80. The piston 76 moves in response to movement of the first valve pin 70. A spring (not shown) is provided within the cylinder 80 adjacent the piston 76 to bias the second valve pin 72 toward the first valve pin 70. The first and second valve pins 70, 72 may alternatively be actuated electrically or by any other known means.

The valve pin 70 includes a melt homogenizing element 82, which is provided adjacent the second end 92 thereof. As shown in FIG. 4, the melt homogenizing element 82 includes a melt channel 83, which is generally a helical groove that is formed in an outer surface 84 of the valve pin 70. The melt channel 83 includes an inlet 98 and an outlet 100 and forms part of the melt transfer channel 37, 39 when the melt transfer device 40 is in a melt delivery position, which is shown in FIG. 3. The melt homogenizing element 82, which is shown in FIGS. 4 and 5, is shaped to force the melt to follow a generally helical path between the first transfer nozzle 36 and the second transfer nozzle 38. The melt homogenizing element 82 causes the melt stream to rotate and thus, overlap and be redistributed as it moves through the melt homogenizing element 82 so that the temperature and viscosity of the melt entering the second melt transfer nozzle 38 will be generally uniform.

The theory of flow through channels of generally circular cross-section and the occurrence of shear induced flow imbalance is well known. The melt that flows near the inner wall of the channel experiences relatively high shear rates, which causes the melt to heat up due to the friction heating of the adjacent fluid streams. This is called "shear heating" and plastic resin has the property of "remembering" all of the shear heating that it has been subjected to as it passes through the tubular channels. The "memory" of shear heating is called the "shear history" of the resin and it manifests itself as a variable viscosity profile across the circular cross-section, which causes the lower viscosity resin to flow more easily and hence preferentially to fill one cavity rather than another.

Figure 6A:
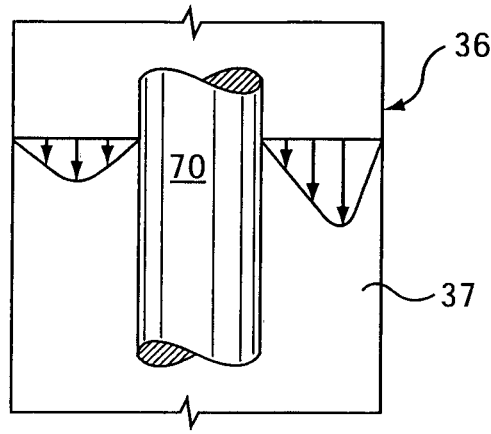
FIG. 6a shows a first viscosity profile of a melt stream.
Figure 7A:
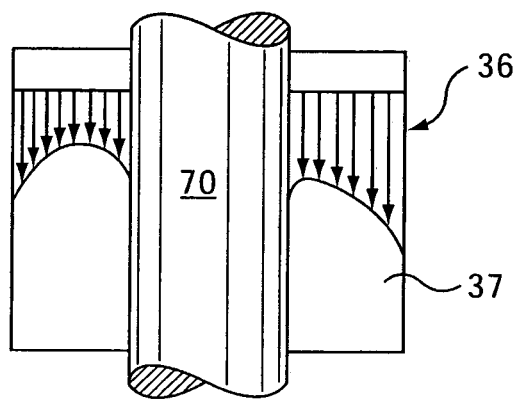
FIG. 7a shows a first temperature profile of a melt stream.

The melt stream enters the first transfer nozzle 36 with a shear history developed from flowing from the machine nozzle 12 and through the sprue inlet 34 and the melt channel 33. Referring to FIGS. 6A and 7A, profiles of the melt stream flowing through melt transfer channel 37 around valve pin 70 are generally shown. The profile of FIG. 7A represents the temperature of the melt, however, a shear stress profile would be similar. The profile of FIG. 6A represents the viscosity of the melt. As shown, the temperature and viscosity distribution of the melt is uneven as the melt stream moves toward the melt homogenizing element 82.

Figure 6B:
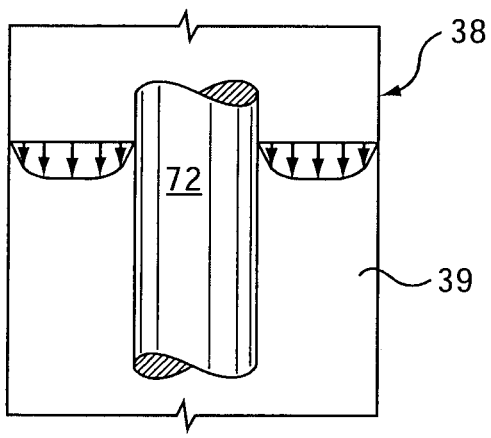
FIG. 6b shows a second viscosity profile of a melt stream.
Figure 7B:
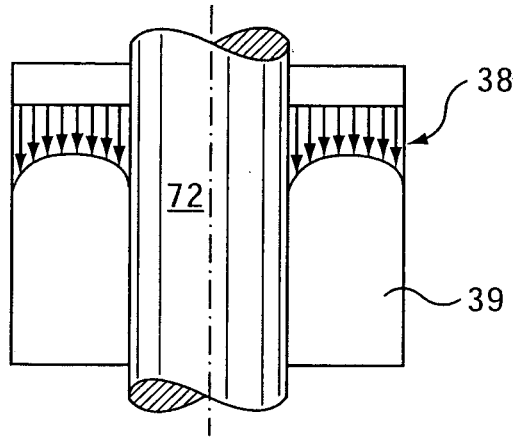
FIG. 7b shows a second temperature profile of a melt stream.

The melt homogenizing element 82 functions to generally reset the shear history of the melt stream so that a homogenized melt stream having a generally uniform temperature and viscosity flows into the second transfer nozzle 38. This generally uniform distribution is generally shown by FIGS. 6b and 7b.

It will be appreciated by a person skilled in the art that the first and second valve pins 70, 72 could be reversed so that the melt homogenizing element 82 would be provided on the valve pin 72 of the second transfer element 38.

Operation of the stack injection molding apparatus 10 according to the present invention will now generally be described. FIG. 3 shows the melt transfer device 40 in a melt delivery position, in which the melt homogenizing element 82 spans the first and second transfer nozzles 36, 38. In this position, a melt stream of moldable material under pressure flows from the machine nozzle 12 into the first transfer nozzle 36. The melt flows through the melt homogenizing element 82 and is redistributed so that the temperature and viscosity of the melt is generally uniform as it travels through the second melt transfer nozzle 38. The melt then flows from the second transfer nozzle 38 into the manifold 50. The manifold 50 distributes the melt stream to the series of nozzles 44. The melt stream flows through the nozzles 44 and into mold cavities 30, 32, where the melt cools to produce molded parts (not shown).

Figure 17B:
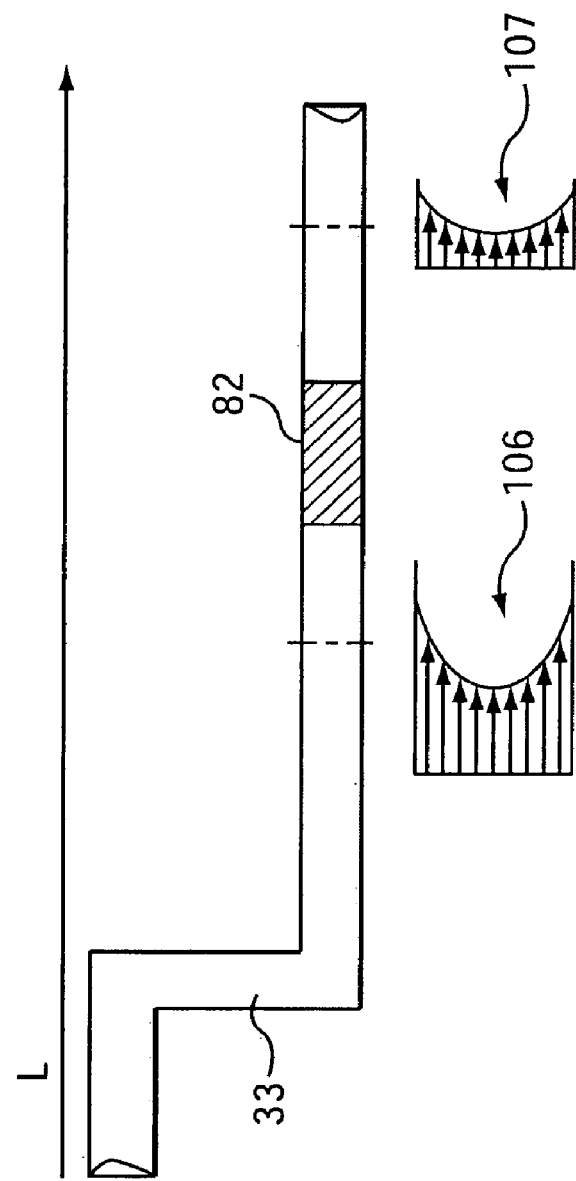
FIG. 17b illustrates the temperature profile for a melt in a long melt channel
Figure 17A:
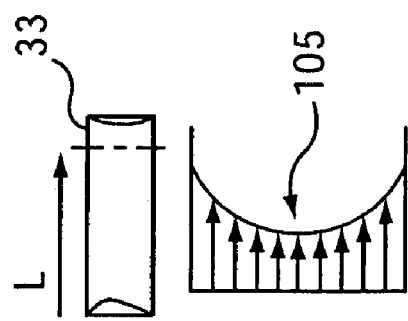
FIG. 17a illustrates the temperature profile for a melt in a short melt channel
Figure 18:
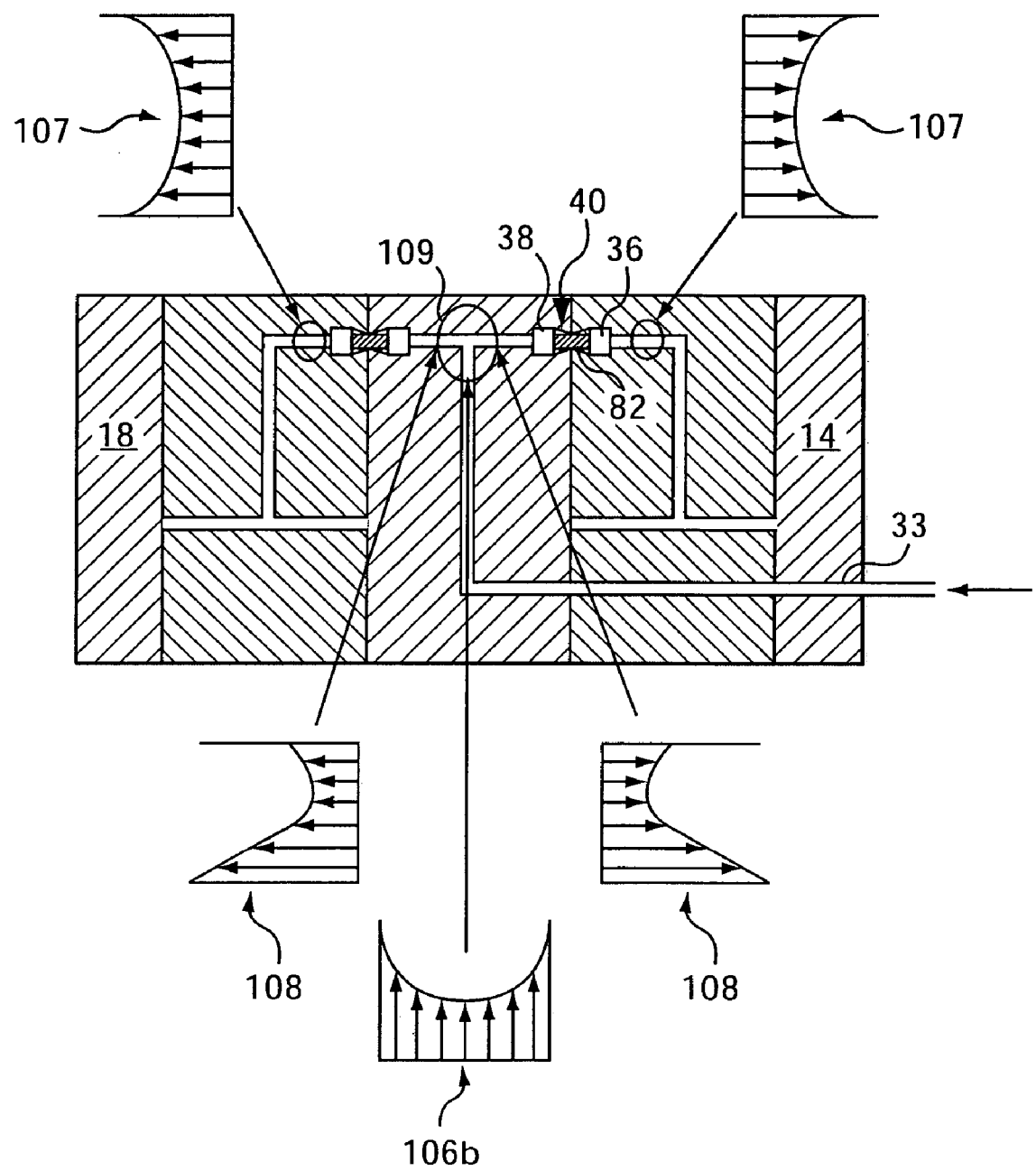
FIG. 18 illustrates the melt temperature profiles for the melt through a four level stack mold.

Melt flow imbalance is a cumulative effect that may be worsened by factors such as the number of times the melt stream is divided in the mold and the distance between the melt source and the mold cavities. FIG. 17A illustrates a temperature profile 105, which is similar to a shear profile for a short melt channel 33. FIG. 17B illustrates the temperature profile 106 of the melt for a longer melt channel 33. Temperature profile 106 shows that the melt closest to the walls of the melt channel 33 is at a higher temperature and has experienced more stress than the melt in the middle of the melt channel 33. Melt homogenizing element 82 is located in the melt channel and homogenizes the melt, resulting in a much more balanced melt temperature profile 107 and a redistribution of the more stressed melt. Stack molds in particular required the melt to travel long distances and make many turns and splits. FIG. 18 shows a four level stack mold with a similar configuration to U.S. Pat. No. 5,229,145 to Brown. The melt temperature profile 106b approaching the split 109 is symmetrical; however, once the melt is split, the temperature profile 107 becomes asymmetrical and unbalanced. A melt transfer device 40, with a melt homogenizing element 82, homogenizes the melt to balance the temperature profile 107.

By homogenizing the melt part way between the machine nozzle and the mold cavities 30, 32, the effect of the melt flow imbalance at the mold cavities 30, 32 may be reduced.

Once the mold cavities 30, 32 have been filled, the flow of melt from the machine nozzle 12 is halted. The piston 74 is then actuated to retract the first valve pin 70 of the melt transfer device 40 to move the valve pin 70 toward a closed position, in which the second end of the valve pin 70 engages gate 46. The second valve pin 72 moves with the first valve pin 70 toward a closed position, in which the second end 96 engages gate 47. As the first valve pin 70 retracts, the melt that is located in the melt homogenizing element 82 is carried away from the mold gates 46, 47 and into the first melt transfer channel 37. The outer surface 84 of the valve pin 70 travels past the mold gates 46, to substantially clear all of the melt from the mold gates 46 prior to opening the mold cavities 30, 32. The valve pins 70, 72 are then seated in the mold gates 46, 47 to block the flow of melt between the first and second passages 37, 39 of the first and second melt transfer nozzles 36, 38.

The movable center platen 16 and the movable second platen 18 then separate from the stationary first platen 14, at parting lines 26 and 28, respectively, and move into a melt interrupted position, which is shown in FIG. 2. As the platens 14, 16 and 18 separate there is substantially no stringing between the first and second melt transfer nozzles 36 and 38. In this position, the cooled, molded parts are ejected from the mold cavities 30, 32.

The melt transfer device 40 of the stack injection molding apparatus 10 allows homogenized melt to be delivered into the manifold 50 and substantially reduces drooling of melt from the melt transfer nozzles 36, 38.

Referring to FIG. 8, another embodiment of a valve pin 70a for use in stack injection molding apparatus 10 is generally shown. The valve pin 70a includes a melt homogenizing element 82a that is located adjacent a second end 92a of the valve pin 70a. The diameter of the melt homogenizing element 82a is slightly less that the valve pin diameter, which is indicated by dashed lines 86. This allows melt to flow both around and through melt channel 83a of the melt homogenizing element 82a. Accordingly, a three-dimensional mixing process occurs. That is, in addition to the helical displacement of the melt along the melt channel 83a, the movement of the melt in the gap between the melt homogenizing element 82a and the inner wall of the first and second melt transfer channels 37, 39 creates a mixing process for a portion of the melt stream, while a remaining portion continues its helical path through the melt channel 83a. This arrangement provides a more aggressive melt redistribution technique than the homogenizing element 82 of FIG. 4. The melt homogenization element 82a generally resets the shear history of the melt stream to provide a melt flow having a generally uniform temperature and viscosity distribution.

FIG. 9 depicts another embodiment of the present invention. A stack injection molding apparatus 10b includes a first transfer nozzle 36b for receiving a melt stream under pressure from a machine nozzle (not shown) through a melt channel 33b. The first transfer nozzle 36b delivers the melt stream to a second transfer nozzle 38b. The melt flows from the second transfer nozzle 38b into a manifold 50b, which delivers the melt to a plurality of nozzles (not shown) to fill a plurality of corresponding mold cavities (not shown).

A melt homogenization element 82b is provided in melt channel 37b of the first transfer nozzle 36b. The melt homogenization element 82b redistributes the melt in the melt flow as it passes therethrough. The homogenization allows the temperature and viscosity of the melt to become generally uniform as it travels into melt channel 39b of the second melt transfer nozzle 38b, as has been previously described.

The first transfer nozzle 36b is thermal gated. Cooling channels (not shown) are provided adjacent nozzle gate 46b to freeze the melt when the injection cycle is complete and the injection molding apparatus is moved to an ejection position.

The second transfer nozzle 38b is a conventional valve gated nozzle having a valve pin 72b extending therethrough. Such nozzles often drool because melt is forced out of the nozzle when the valve is extended to engage the gate. Drooling from the transfer nozzles 36b, 38b is reduced using suck back by the machine nozzle (not shown). The suck back reduces drooling of unfrozen melt from the first transfer nozzle 36b and also reduces drooling from the second transfer nozzle 38b because excess melt is drawn into the first transfer nozzle 36b.

It will be appreciated by persons skilled in the art that each of the melt homogenizing elements disclosed herein may be provided with a greater number of turns, if so desired. The pitch may also be varied to suit a particular application.

Figure 10:
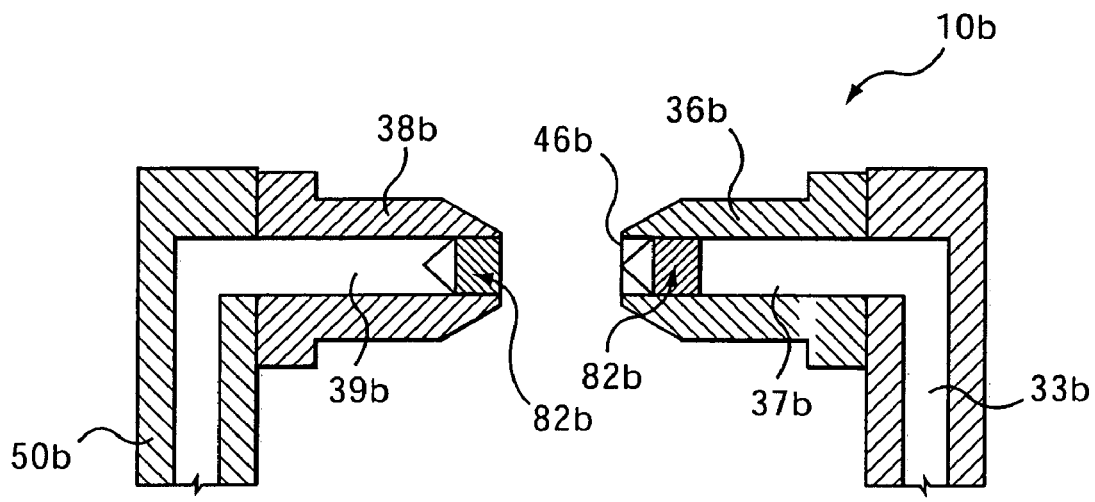
FIG. 10 is a schematic side sectional view of portions of an injection molding apparatus according to yet another embodiment of the present invention.

The second transfer nozzle 38b may also be provided with a melt homogenization element 82b similar to the first transfer nozzle 36b, as shown in FIG. 10. This arrangement provides two melt homogenization steps for the melt stream. Alternatively, the second transfer nozzle 38b may be fitted with a melt homogenization element 82b, and the first transfer nozzle 36b may be fitted with a valve pin (not shown).

Figure 11:
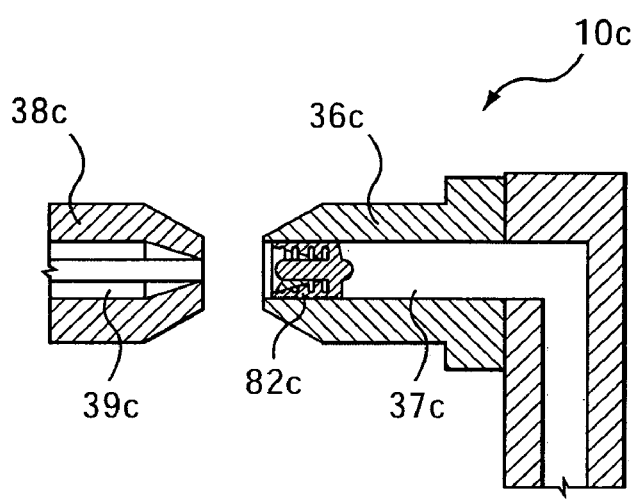
FIG. 11 is a schematic side sectional view of portions of an injection molding apparatus according to still another embodiment of the present invention.

Further, the melt homogenizing elements may be replaced with any suitable type of homogenizing element known in the art. One such melt homogenizing element 82c, which is described in PCT Publication No. WO 02/087846 and is herein incorporated by reference, is shown in FIG. 11. The melt homogenizing element 82c is provided in melt channel 37c of the first transfer nozzle 36c of a stack injection molding apparatus 10c. The melt homogenization element 82c blends the melt as it passes therethrough. The homogenization allows the temperature and viscosity of the melt to become generally uniform as it travels into melt channel 39c of the second melt transfer nozzle 38c.

Figure 12:
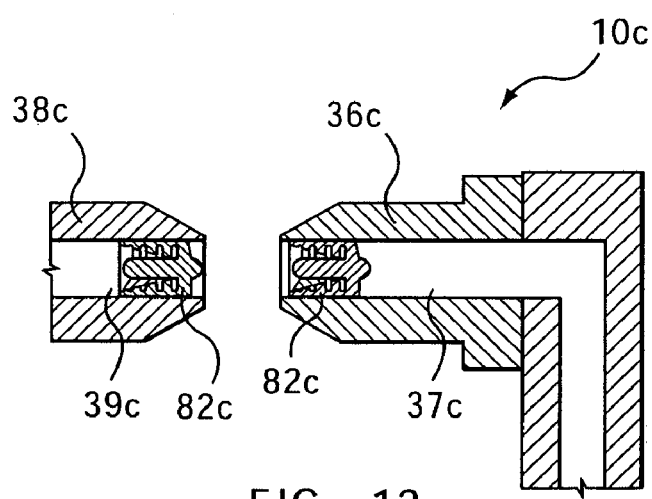
FIG. 12 is schematic side sectional view of portions of an injection molding apparatus according to another embodiment of the present invention.

The second transfer nozzle 38c may also be provided with a melt homogenization element 82c similar to the first transfer nozzle 36c, as shown in FIG. 12. This arrangement provides two melt homogenization steps for the melt stream.

A further type of melt homogenization element that may be used is disclosed in U.S. Pat. No. 5,941,637 to Maurer, the contents of which are herein incorporated by reference.

The various melt homogenizing element embodiments described herein may be employed in any type of stack injection molding apparatus having a movable transfer nozzle for receiving a melt stream from a source.

Figure 13:
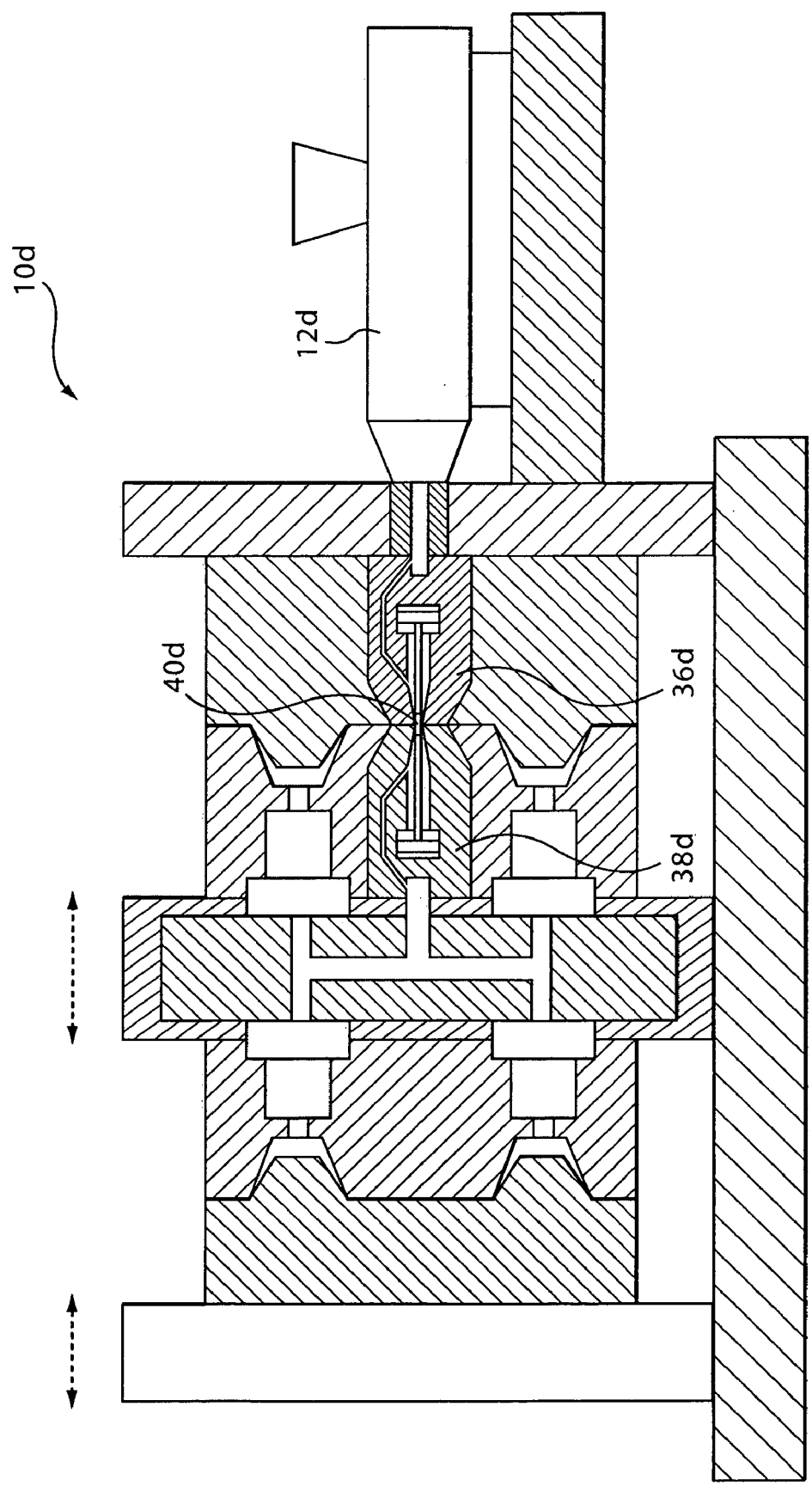
FIG. 13 is a schematic side view partly in section of another embodiment of an injection molding apparatus.

Another embodiment of a stack injection molding apparatus 10d is shown in FIG. 13. This type of stack injection molding apparatus 10c is similar to those previously described, however, first and second transfer nozzles 36d, 38d are arranged in-line with machine nozzle 12d. A melt transfer device 40d, which may be any of the melt transfer devices previously described, is provided between the first melt transfer nozzle 36d and the second melt transfer nozzle 38d to control the flow of melt therebetween.

Figure 14:
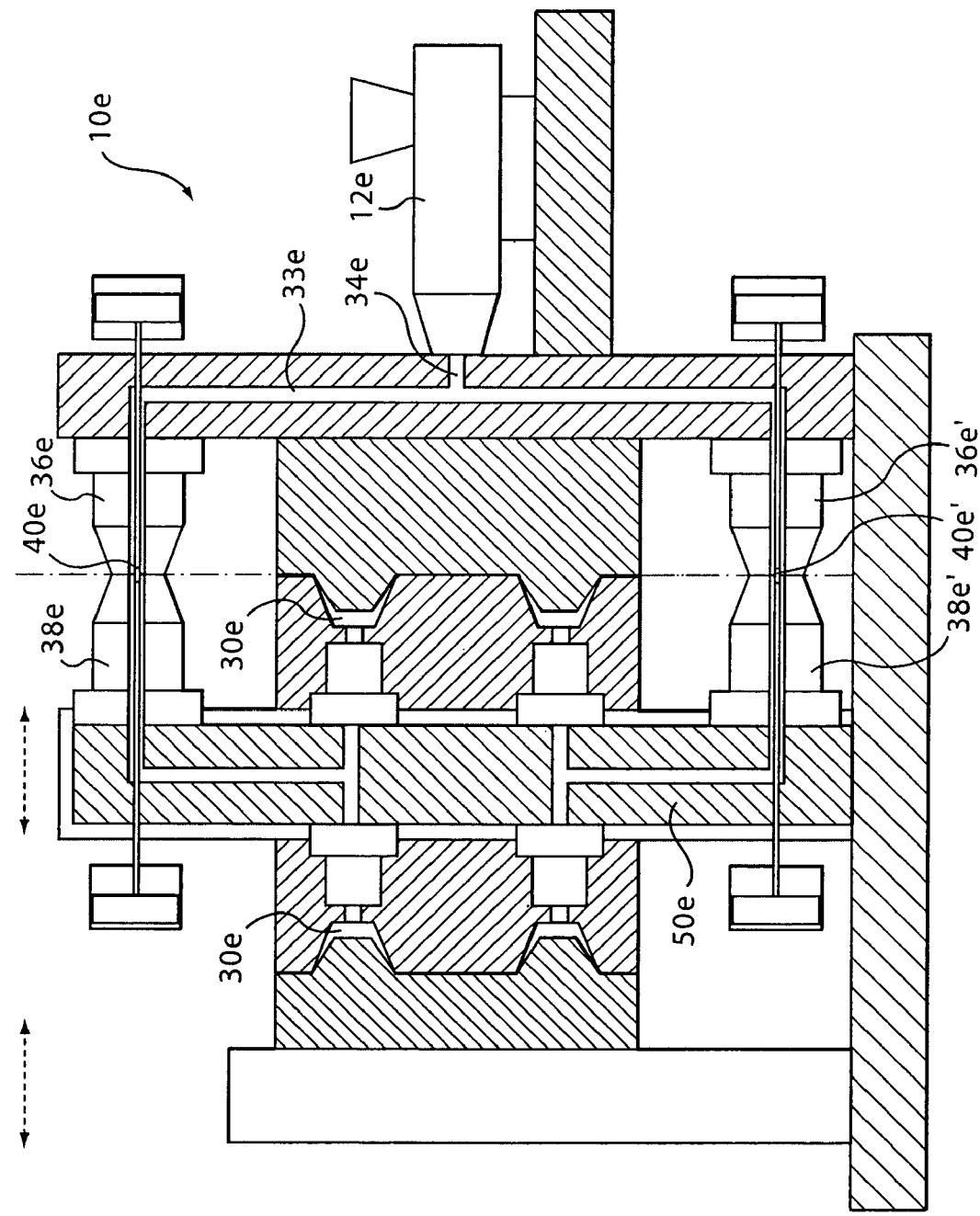
FIG. 14 is a schematic side view partly in section of yet another embodiment of an injection molding apparatus.

Another embodiment of a stack injection molding apparatus 10e is shown in FIG. 14. The stack injection molding apparatus 10d includes two transfer nozzle pairs, 36e, 38e and 36e', 38e', respectively. A melt stream is delivered from the machine nozzle 12e, through sprue bushing 34e, and split into the first transfer nozzles 36e, 36e' by melt channel 33e. The melt stream passes through melt transfer devices 40e, 40e', which are associated with each transfer nozzle pair, and into manifold 50e. The manifold 50e delivers the melt to the mold cavities 30e and 32e. The two pairs of transfer nozzles allow the stack injection molding apparatus 10c to achieve a balanced melt flow.

Figure 15:
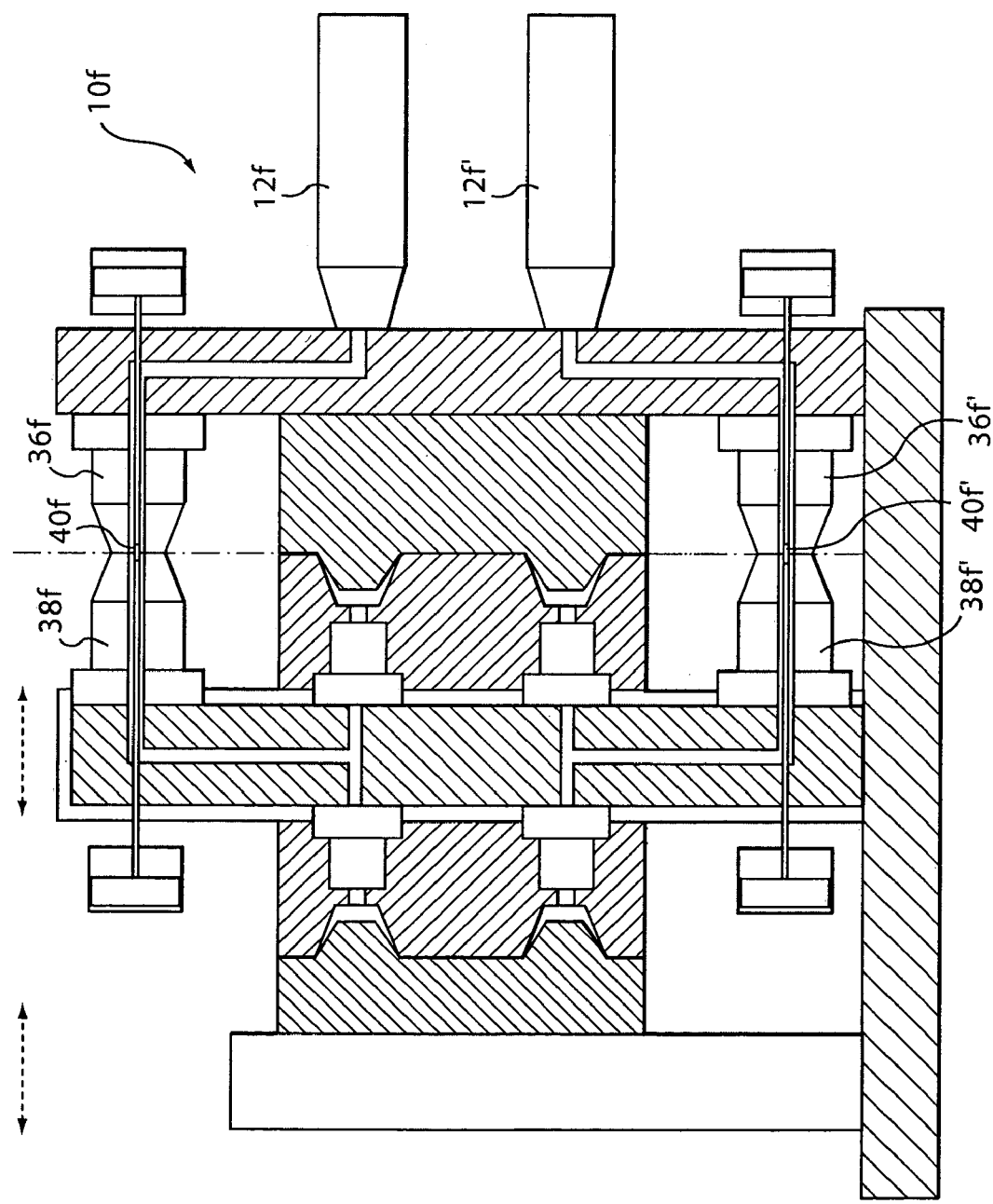
FIG. 15 is a schematic side view partly in section of still another embodiment of an injection molding apparatus.

Yet another embodiment of a stack injection molding apparatus 10f is shown in FIG. 15. Similar to stack injection molding apparatus 10e, which is shown in FIG. 14, stack injection molding apparatus 10f includes two transfer nozzle pairs, 36f, 38f and 36f', 38f', respectively, however, melt is delivered to each transfer nozzle pair by a separate machine nozzle 12f and 12f'. This arrangement allows each machine nozzle to deliver a different material, such as a different type of resin or a different color of resin, for example.

It will be appreciated by a person skilled in the art that the mold cavities on opposite sides of the movable center platen may have different shapes.

Figure 16:
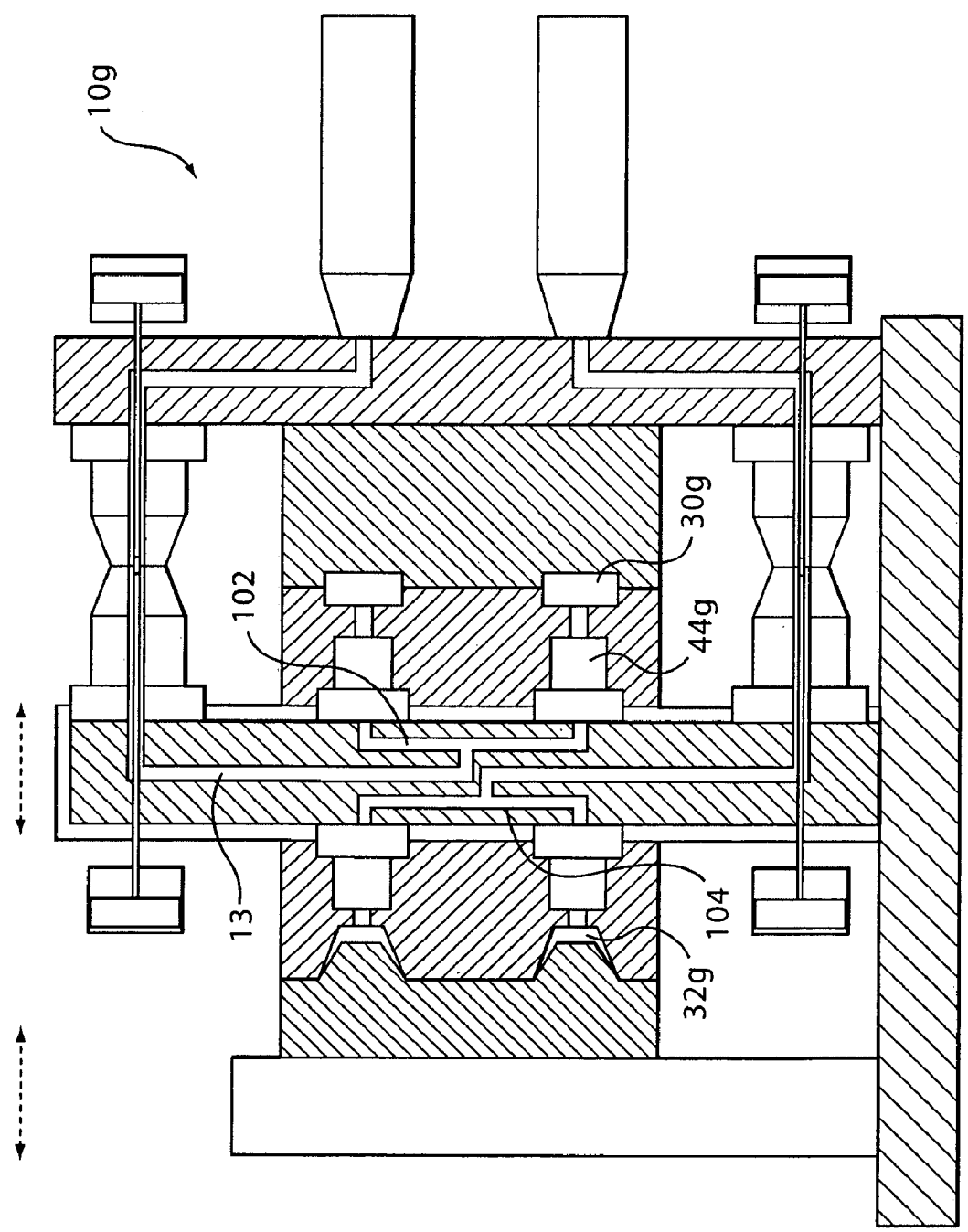
FIG. 16 is a schematic side view partly in section of another embodiment of an injection molding apparatus.

Still another embodiment of a stack injection molding apparatus 10g is shown in FIG. 16. The injection molding apparatus 10g is similar to injection molding apparatus 10f, which is shown in FIG. 15, however, the manifold includes a manifold channel 13, which is divided into a pair of manifold sub-channels 102, 104, which deliver melt to mold cavities 30g and 32g, respectively, through nozzles 44g. The mold cavities 30g have a different shape than mold cavities 32g, however, the cavities 30g and 32g may alternatively have the same shape.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of improving melt flow in a stack injection molding apparatus comprising:
   providing a first transfer nozzle having a first melt channel for receiving a melt stream from a melt source, said melt stream having a first temperature and viscosity distribution;
   providing a second transfer nozzle having a second melt channel for receiving said melt stream from said first melt channel, wherein one of said first or second transfer nozzles includes a movable valve pin for controlling the flow of the melt stream between said first transfer nozzle and said second transfer nozzle;
   providing a melt homogenizing element coupled to said valve pin for changing said melt stream from said first temperature and viscosity distribution to a second temperature and viscosity distribution, wherein said second temperature and viscosity distribution is more uniform than said first temperature and viscosity distribution; and
   transferring the melt stream from the first transfer nozzle to the second transfer nozzle through the melt homogenizing element.

2. The method defined in claim 1, wherein said melt homogenizing element mixes said melt stream to change said first temperature and viscosity distribution to said second temperature and viscosity distribution.

3. The method defined in claim 1, wherein said melt homogenizing element rotates said melt stream to change said first temperature and viscosity distribution to said second temperature and viscosity distribution.

4. The method defined in claim 1, wherein said first melt channel and said second melt channel are selectively in fluid communication with one another.

5. The method defined in claim 4, wherein said first transfer nozzle and said second transfer nozzle are selectively separable from one another.

6. The method defined in claim 5, wherein said melt homogenizing element is configured to reduce drooling of the melt stream when said first transfer nozzle and said second transfer nozzle are separated from one another.

7. An injection molding apparatus comprising:
   a first melt transfer nozzle having a first melt transfer channel for receiving a melt stream of a moldable material under pressure;
   a melt homogenizing element coupled to a valve pin and having a melt homogenizing channel for receiving the melt stream from the first melt transfer channel, wherein said melt homogenizing element resets a shear history of said melt stream;
   a second melt transfer nozzle having a second melt transfer channel for selectively receiving said melt stream from said melt homogenizing channel, wherein the valve pin extends through one of said first and second melt transfer channels and has a diameter sized to restrict melt flow between said first melt transfer channel and said second melt transfer channel when in a closed position and allows melt to flow between said first melt transfer channel and said second melt transfer channel through said melt homogenizing element when in an open position;
   a manifold having a manifold channel for receiving said melt stream from said second melt transfer channel and delivering said melt stream to a nozzle channel of a nozzle; and
   a mold cavity receiving said melt stream from said nozzle, said nozzle channel communicating with said mold cavity through a mold gate.

8. The injection molding apparatus defined in claim 7, wherein said melt homogenizing channel of said melt homogenizing element is generally helically shaped.

9. The injection molding apparatus defined in claim 7, wherein said melt homogenizing element is integral with said valve pin and said valve pin is movable to selectively locate said melt homogenizing element across a portion of said first melt transfer channel and a portion of said second melt transfer channel simultaneously to allow melt to flow between said first melt transfer channel and said second melt transfer channel.

10. A stack mold injection molding apparatus comprising:
    a first melt transfer nozzle having a first melt transfer channel for receiving a melt stream of a moldable material;
    a second movable melt transfer nozzle having a second melt transfer channel in fluid communication with the first melt transfer channel;
    a movable valve pin configured to control the melt stream from the first melt transfer nozzle to the second melt transfer nozzle;
    a melt homogenizing element connected to said valve pin and disposed between the first melt transfer channel and the second melt transfer channel, wherein the melt homogenizing element redistributes melt in the melt stream such that the melt stream exiting the melt homogenizing element has a more uniform temperature and viscosity distribution than the melt stream entering the melt homogenizing element;
    a manifold having a manifold channel for receiving the melt stream from the second melt transfer channel and delivering said melt stream to a plurality of nozzles;
    a plurality of mold cavities for receiving said melt stream from said nozzles, said nozzles communicating with said mold cavities through a plurality of mold gates.

11. The stack mold injection molding apparatus defined in claim 10, wherein the melt homogenizing element connected to the valve pin is located in the second movable melt transfer nozzle.

12. A stack injection molding apparatus comprising:
a machine nozzle configured to deliver a melt material to a sprue inlet;
a first transfer nozzle having a first melt channel in fluid communication with the sprue inlet;
a first movable valve pin disposed within the first melt channel, wherein the first movable valve pin is configured to control a flow of melt through the first melt channel;
a melt homogenizing element integral with said first moveable valve pin, wherein the melt homogenizing element is configured to redistribute the melt in the first melt channel such that the melt exiting the melt homogenizing element has a more uniform temperature profile than the melt entering the melt homogenizing element;
a second transfer nozzle having a second melt channel in fluid communication with the first melt channel, wherein the second transfer nozzle is mounted on a movable platen and is movably coupled to the first transfer nozzle;
a manifold having a manifold melt channel in fluid communication with the second melt channel; and
a nozzle having a nozzle melt channel in fluid communication with the manifold melt channel, wherein the nozzle is configured to deliver the melt to a mold cavity.

13. The stack injection molding apparatus defined in claim 12, further including a movable valve pin disposed within the second melt channel, wherein the movable valve pin is configured to control a flow of melt through the second melt channel.

14. The stack injection molding apparatus defined in claim 12, further including a second melt homogenizing element disposed within the second melt channel, wherein the second melt homogenizing element is configured to redistribute the melt in the second melt channel such that the melt exiting the second melt homogenizing element has a more uniform temperature profile than the melt entering the second melt homogenizing element.

15. The stack injection molding apparatus defined in claim 14, wherein the second melt homogenizing element is integral with a second movable valve pin disposed within the second melt channel, wherein the second movable valve pin is configured to control a flow of melt through the second melt channel.

16. The stack injection molding apparatus defined in claim 12, wherein the melt homogenizing element extends from the first melt channel to the second melt channel when the stack injection molding apparatus is in a melt delivery position.

17. A stack injection molding apparatus comprising:
a machine nozzle configured to deliver a melt material to a sprue inlet;
a first transfer nozzle having a first melt channel in fluid communication with the sprue inlet;
a second transfer nozzle having a second melt channel in fluid communication with the first melt channel, wherein the second transfer nozzle is mounted an a movable platen and is movably coupled to the first transfer nozzle;
a first movable valve pin disposed within the second melt channel, wherein the movable valve pin is configured to control a flow of melt through the second melt channel;
a melt homogenizing element disposed integral with said first movable valve pin, wherein the melt homogenizing element is configured to redistribute the melt in the second melt channel such that the melt exiting the melt homogenizing element has a more uniform temperature profile than the melt entering the melt homogenizing element;
a manifold having a manifold melt channel in fluid communication with the second melt channel; and
a nozzle having a nozzle melt channel in fluid communication with the manifold melt channel, wherein the nozzle is configured to deliver the melt to a mold cavity.

18. The stack injection molding apparatus defined in claim 17, further including a second movable valve pin disposed within the first melt channel, wherein the second movable valve pin is configured to control a flow of melt through the first melt channel.

19. The stack injection molding apparatus defined in claim 17, further including a second melt homogenizing element integral with a second movable valve pin disposed within the first melt channel, wherein the second melt homogenizing element is configured to redistribute the melt in the first melt channel such that the melt exiting the second melt homogenizing element has a more uniform temperature profile than the melt entering the second melt homogenizing element, and wherein the movable valve pin is configured to control a flow of melt through the first melt channel.

20. The stack injection molding apparatus defined in claim 17, wherein the melt homogenizing element extends from the second melt channel to the first melt channel when the stack injection molding apparatus is in a melt delivery position.

* * * * *